Jan. 1, 1924

L. ZIDAKOVITS

ADJUSTABLE COUNTERBORER

Filed Nov. 24, 1922

Inventor
Louis Zidakovits
Joseph L. Wright
Atty.

Patented Jan. 1, 1924.

1,479,488

UNITED STATES PATENT OFFICE.

LOUIS ZIDAKOVITS, OF CLEVELAND, OHIO.

ADJUSTABLE COUNTERBORER.

Application filed November 24, 1922. Serial No. 603,004.

*To all whom it may concern:*

Be it known that LOUIS ZIDAKOVITS, subject of the Republic of Austria, present Government of Hungary, residing at Cleveland, in the county of Cuyahoga and State of Ohio, has invented certain new and useful Improvements in Adjustable Counterborers, of which the following is a specification.

My invention relates to improvements in counter borers or reaming devices. The object of my invention is to produce a counter borer which is readily adjustable so that different size holes may be drilled or counter sunk.

The device is adapted to be used either in wood or iron working. The device comprises a main portion provided with a shank arranged to be held by the jaws of the chuck of an ordinary drill press. The cutting end of the main portion is provided with a pilot or centering pin or shaft which can be removed at will. Surrounding the pilot shaft is an eccentric portion provided with cutting edges. Surrounding this eccentric portion is another eccentric portion likewise provided with cutting edges and adapted to be rotated so that the cutting surface can be enlarged or reduced as required. The latter mentioned eccentric portion is calibrated or scaled so as to operate in conjunction with the main portion of the device.

My invention is illustrated in the accompanying drawings wherein.

Figure 1:
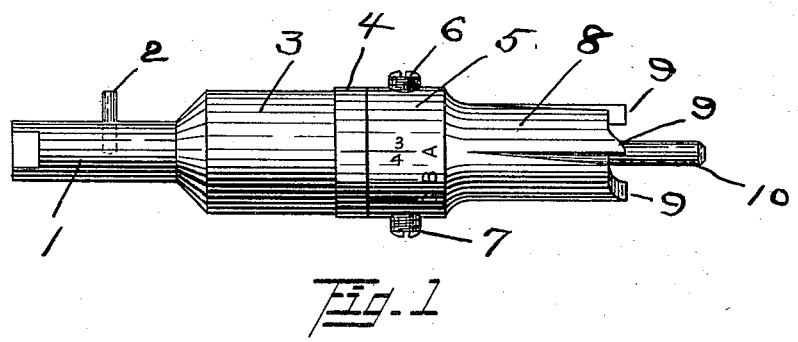
Fig. 1 is a side view of the assembled device, with the cutting edges in their extreme reduced cutting position.
Figure 2:
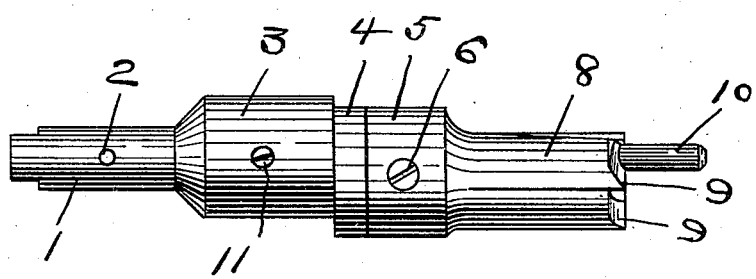
Fig. 2 is a side view of the device showing the cutting edges in their extreme enlarged cutting position.
Figure 3:
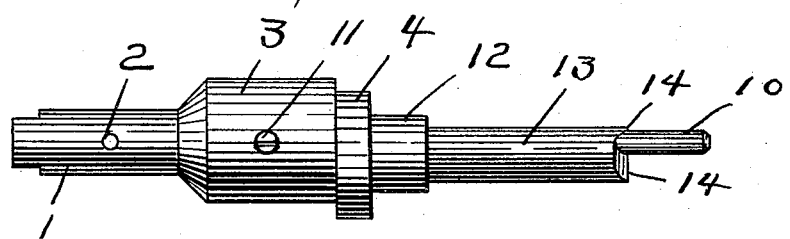
Fig. 3 is a side view showing the outer cutting edge portion removed.
Figure 4:
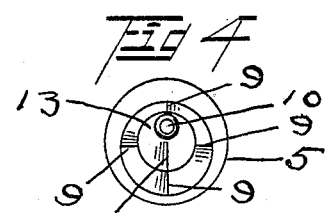
Fig. 4 is an end view showing the cutting edges in their extreme enlarged cutting position.
Figure 5:
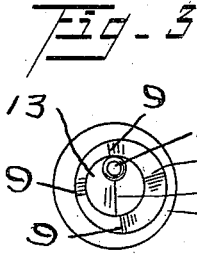
Fig. 5 is an end view showing the cutting edges in another cutting position.
Figure 6:
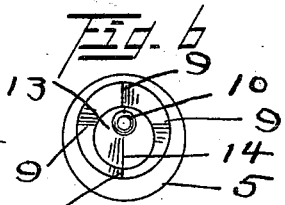
Fig. 6 shows the cutting edges in their extreme reduced cutting position.

Referring first to Figures 1, 2 and 3, it will be noted that the device comprises the main or shank portion 1 which is adapted to be engaged by the jaws of a chuck. The enlarged portion 3 is provided with the set screw 11 which engages the pilot pin 10. This pin 10 extends thru the portions 13, 12 and 4 and by loosening the screw 11, the pin 10 may be entirely withdrawn.

It will be noted that the portions 13, 12 and 4, while integral with the portions 2 and 3 are off center or in eccentric relation to the portions 2, 3 and 10. The portion 13 is provided with cutting edges 14.

The outer portion or shell 8 provided with the cutting edges 9 is adapted to slip over portion 13 and to rotate thereon. The portion 8 is provided with two set screws 6 and 7, which engage the portion 12, so as to prevent its turning when the device is in operation.

By loosening the set screws 6 and 7 and turning the portion 8, the cutting edges 9 can be adjusted by means of the scale or calibrations marked upon the portion 5 as shown in Figure 1.

As the portion 13 is eccentric in relation to the pilot pin 10 and the portion 8 eccentric in relation to the portion 13, it naturally follows when the portion 8 rotates that the cutting surface or radius of the edges 9 are increased or diminished as desired.

In order to operate the device, the material to be counter bored, whether it be of iron or wood, is first drilled to receive the pilot 10, after which the cutting edges 9 and 14 counter-sink the material during the rotation of the chuck which holds the shank 2. The shank 2 is provided with a pin 2 which passes between the openings of the jaws of the chuck, so as to prevent the shank turning within the jaws of the chuck due to any undue stress.

Figure 7:
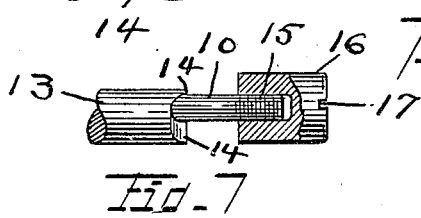
Fig. 7 is a modification wherein the pilot pin is provided with an adjustable head.

When it is desirable to use a larger size guide hole in the material to be drilled, the attachment shown in Figure 7 may be used. In this case, the pilot pin 10 is threaded at 15, so as to engage the threaded portion of the pilot head 16. The pilot head is provided with a slot 17, so that it can be readily turned by means of an ordinary screw driver. In practice, the threaded portion 13 may be tapered and the threaded portion of the head 16, likewise tapered. The opening in the head 16 can then be of sufficient depth to enclose or surround a portion of the unthreaded portion of the pin 10 for strengthening purposes.

Having thus described my invention what I desire to secure by Letters Patent is:

1. A counter borer comprising a shank adaptd to be gripped by the jaws of a chuck, a pilot pin associated with and having the same center line as the shank, a sleeve surrounding the pilot pin and the outer surface having an eccentric relation thereto, a rotatable member mounted upon said sleeve and having an eccentric relation thereto and provided with a cutting edge, the eccentric relation of the sleeve pilot pin and rotatable member serving to permit the adjustment of the cutting edge for drilling holes of different sizes.

2. A counter borer comprising a pilot, a sleeve for said pilot and bearing an eccentric relation thereto, a second sleeve provided with a cutting edge and eccentrically mounted upon said first sleeve, said eccentric relations serving to permit the adjustment of said cutting edge for drilling holes of different sizes.

3. A counterborer comprising a shank adapted to be gripped by the jaws of a chuck, a member having an eccentric relation to said shank, a sleeve provided with a cutting edge mounted upon said member and having an eccentric relation thereto, the eccentric relations serving to permit the adjustment of said cutting edge for drilling holes of different sizes.

In testimony whereof I affix my signature in the presence of two witnesses.

LOUIS ZIDAKOVITS.

Witnesses:
IRVING W. COLE,
W. A. COY.